United States Patent
Hershey et al.

(10) Patent No.: US 6,728,580 B2
(45) Date of Patent: Apr. 27, 2004

(54) METHOD AND APPARATUS FOR ESTIMATING TIME TO FAILURE ACCELERATION FACTOR

(75) Inventors: John Erik Hershey, Ballston Lake, NY (US); Brock Estel Osborn, Niskayuna, NY (US); Kati Illouz, Albany, NY (US); Gerald Burt Kliman, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 480 days.

(21) Appl. No.: 09/791,034

(22) Filed: Feb. 20, 2001

(65) Prior Publication Data

US 2002/0161457 A1 Oct. 31, 2002

(51) Int. Cl.$^7$ .............................................. G05B 11/01
(52) U.S. Cl. .............................. 700/21; 700/78; 700/79; 700/170; 700/279; 700/280; 700/304; 318/565; 318/563; 318/568.16; 318/568.18
(58) Field of Search .............................. 700/21, 78, 79, 700/80, 81, 82, 159, 170, 173, 175, 279, 280, 304; 318/1, 3, 565, 563, 561, 568.16, 568.18

(56) References Cited

U.S. PATENT DOCUMENTS

| | | | |
|---|---|---|---|
| 4,720,897 A | | 1/1988 | Orrell et al. |
| 5,298,842 A | | 3/1994 | Vanek et al. |
| 5,419,293 A | * | 5/1995 | Nagai ........................ 123/336 |
| 5,629,871 A | * | 5/1997 | Love et al. .................... 702/34 |
| 6,035,265 A | * | 3/2000 | Dister et al. ................. 702/183 |
| 6,301,531 B1 | * | 10/2001 | Pierro et al. ................... 701/29 |
| 6,396,229 B1 | * | 5/2002 | Sakamoto et al. ........... 318/439 |
| 6,590,366 B1 | * | 7/2003 | Browning et al. ............. 322/49 |

| | | | |
|---|---|---|---|
| 2002/0161457 A1 | * | 10/2002 | Hershey et al. ............... 700/21 |

OTHER PUBLICATIONS

A Kronecker Product Improvement to PCA for Space Time Adaptive Processing, Ritcey et al., 2000 IEEE, pp. 651–655.*

Computation of Kronecker–Like Forms of a Applications, Algorithms and Software, Varga, 1996, IEEEE, pp. 77–82.*

"Basics of Multi–Stress Aging Tests: Survey of Actual Operating Conditions of Large Industrial Motors," P. Paloniemi; A. Ristola, IEEE International Symposium on Electrical Insulation, 1990, pp. 4–7.

"Estimation of Lifetime Expectancies of Motors," EL Brancato, IEEE Electrical Insulation Magazine, vol. 8, No. 3, 1992, pp. 5–13.

"History and Development of Non–Intrusive Electrical Testing and Assessment of DC Traction Motor Armature Condition and Reliability During Overhaul," A. Helwig, Seventh International Conference on Electrical Machines and Drives, 1995, pp. 111–115.

"Optimization of Facsimile Data Compression," R. Ohnishi, Y. Ueno, F. Ono, National Telecommunications Conference Record, 1977, pp. 49.1.1–49.1.6.

"A Review of Plastic–Encapsulated–Microcircuit Reliability–Prediction Models," Y–L Mok, L–M Ten, Annula Reliability and Maintainability Symposium, 2000, pp. 200–209.

* cited by examiner

Primary Examiner—Ramesh Patel
(74) Attorney, Agent, or Firm—David C. Goldman; Patrick K. Patnode

(57) ABSTRACT

An apparatus for estimating the time to failure acceleration factor of a large industrial motor includes a sensor, a clock for controlling sensor sampling times, and a memory address calculator for mapping output signals of the sensor to a memory address. A unit is provided for incrementing the content of a specified memory address by unity.

17 Claims, 4 Drawing Sheets

| Sampling Time | T | RH | T-Quant. | RH-Quant. | Kronecker Address | Increment Memory Location |
|---|---|---|---|---|---|---|
| 1 | 20 | 10 | 00 | 0 | 000 | 0 |
| 2 | 100 | 15 | 10 | 0 | 100 | 4 |
| 3 | 100 | 20 | 10 | 0 | 100 | 4 |
| 4 | 150 | 80 | 11 | 1 | 111 | 7 |

*fig. 4*

METHOD AND APPARATUS FOR ESTIMATING TIME TO FAILURE ACCELERATION FACTOR

BACKGROUND OF THE INVENTION

This invention relates generally to estimation of cumulative wear on large industrial electric motors, and, more particularly, to a method and apparatus for determining a cumulative wear measure.

It has become increasingly clear that monitoring of selected parameters is an essential component of reliability prediction and insurance. The lifetime of a large industrial electrical motor, for example, is influenced by many factors including operating and environmental conditions. In their article "Basics of multi-stress aging tests: survey of actual operating conditions of large industrial motors," published in the Conference Record of the 1990 IEEE International Symposium on Electrical Insulation, pp. 4–7, P. Paloniemi and A. Ristola suggest that in addition to the motor operating temperature, which in itself will be somewhat dependent on ambient temperature, design service considerations for evaluating stresses on large industrial motors should include such items as:

The number of electrical starts per year

Switchgear, as it is associated with impulses that can adversely impact insulation Relative humidity Dirt E. L. Brancato, in the article "Estimation of Lifetime Expectancies of Motors," published in the IEEE Electrical Insulation Magazine, Vol. 8, No. 3, 1992, on pp. 5–13 advises concerning motor insulation that in most motors, temperatures may vary during their lifetime due to operating and non-operating conditions in the plant. In order to predict the lifetimes of insulation, the duration of operation at these temperatures must be estimated. Brancato also states that the electrical endurance qualities of insulation are affected by both temperature and time, noting that relatively moderate temperatures will cause failure if maintained for very long periods of time.

Brancato also relates some illuminating history respecting thermal effects on insulation pointing out that in 1930, Montsinger introduced the concept of the 10° rule, which states that the thermal life of insulation is halved for each increase of 10° C. in the exposure temperature, while in 1948, Dakin postulated that the rate of thermal aging of insulation was another way of stating that the rate of temperature-induced changes (deterioration) obeyed the Arrhenius chemical rate equation. Using this basic concept, Brancato points out that the life of insulation aged at elevated temperatures was expressed as:

$$L = B \exp\left[\frac{\varphi}{kT}\right]$$

where L is the life in units of time (min, hr, etc.), B a constant (usually determined experimentally), $\varphi$ the activation energy (eV), T the absolute temperature (° K), and $k=0.8617 \times 10^{-4}$ (eV/K) the Boltzmann constant.

Taking the logarithm of both sides of this equation, $$\ln L = \ln B + \frac{\varphi}{kT}$$

Thus, if the logarithm of the life of the insulation is plotted against the reciprocal of the absolute temperature, a straight line results.

There are numerous reports concerning industrial experiences such as that of A. Helwig in the article "History and development of non-intrusive electrical testing and assessment of DC traction motor armature condition and reliability during overhaul," published in the Seventh International Conference on Electrical Machines and Drives, 1995, pp. 111–115. Helwig notes that Queensland Rail (QR) uses its motive rollingstock, employing DC traction motors, in a highly variable climate—from a Southern Queensland Highland location at just below 0° Celsius for part of the year, to normal high humidity operation during the summer months, and from dry temperate operation in the winter months to tropical monsoonal conditions. Ambient trackside air temperatures in the tropics and on the coast can be as high as 50° C. These climatic variations, both seasonal and extreme, stress insulation systems.

Many crucial parameters of interest can be identified through consideration of the physics of wear and failure. Monitoring wear and failure is expected to be key to reducing the variance of lifetime estimators, which in turn should lead to a concomitant decrease in underwriting Long Term Service Agreement contracts. There is accordingly a need to equip electromechanical equipment, such as a motor and its control electronics, with inseparable sensors and recorders so as to be able to better assess the motor condition and better predict the time to failure. There are three important desiderata:

Identifying most important factors for predicting failure.

Estimating the sensitivity of the above-identified factors from empirical studies and physics.

Archiving the data collection on-board with only a nominal amount of data storage.

BRIEF SUMMARY OF THE INVENTION

In accordance with a preferred embodiment of the invention, a statistical monitoring method and apparatus is employed to compute and store the history of a function of one or more monitored environmental variables that is useful for estimation, with suitable precision, of the time to failure of a particular electromechanical system.

BRIEF DESCRIPTION OF THE DRAWINGS

FIG. 4 is an example of an acceleration factor estimator in accordance with FIG. 1, using two sensors with different numbers of quantization levels.

DETAILED DESCRIPTION OF THE INVENTION

Figure 1:
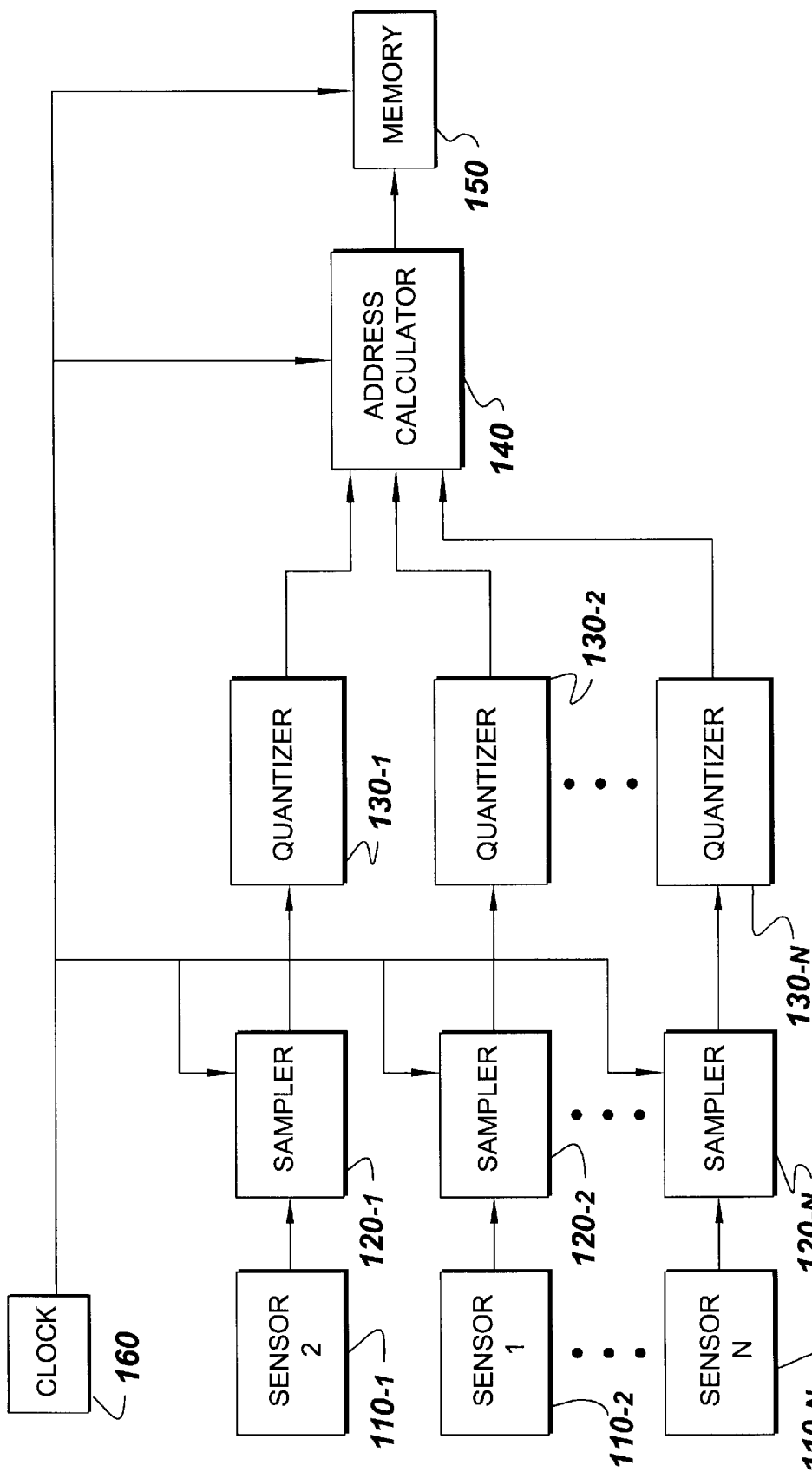
FIG. 1 is a schematic illustration of an acceleration factor estimator using tailored quantizers, in accordance with a preferred embodiment of the invention.

FIG. 1 illustrates a preferred embodiment 100 of the acceleration factor estimator using tailored quantizers composed of one or more sensors, such as sensors 110-1, 110-2, . . . , 110-N, that generate continuous electrical output signals relating to the value of the environmental quantities or variables that they are measuring. These continuous output signals are sent to samplers, such as samplers 120-1, 120-2, . . . , 120-N, that, under control of a clock, 160, sample the continuous output signals at a sampling rate of S samples per second, or S samples-Hz. The samples are sent to respective quantizers, such as quantizers 130-1, 130-2, . . . , 130-N, each quantizer having been designed such that the quantization error introduced into the acceleration factor estimator by the quantizer is approximately constant over the range of the measured variable. The output signals of the quantizers are combined in an address calculator 140 that performs a one-to-one mapping of the quantizer output signals to a memory unit address which is provided to a memory 150 which increments the content of the address calculator specified address by unity.

The invention produces a relatively small data set that may be used to produce an acceleration factor for more accurate failure prediction. The output signals of sensors appropriate to monitoring the most important failure environmental factors are sampled. Each sensor output signal is quantized with a respective quantizer specifically tailored to sensitivity of the individual sensor in the reliability acceleration factor. The quantized output signals constitute a product or Kronecker address and the content of a memory location corresponding to that address is incremented by unity. This technique satisfies the third of the three desiderata above, as is apparent if the sensors are considered to be sampled at a rate of S samples-Hz and sensor$^i$ is considered to produce $^{B_i}$ bits per quantized sample. By using a memory that has $$2_i^{\Sigma B_i}$$

memory locations, where each location has the capability of storing a W-bit word where W=$\lceil \log_2(T \cdot S) \rceil$ and T is the maximum time in seconds between reading and resetting the memory, only $$2_i^{\Sigma B_i} \cdot W$$

bits of storage are required as contrasted, say, with a "brute force" approach of storing the output signal of each sensor at each sampling instant, which would require a memory of $$S \cdot T \cdot \sum_i B_i$$

bits.

It is expected that there will be long strings of the same Kronecker address, and in another embodiment a compression coding is applied to the sequence of Kronecker addresses. Suitable compression would be provided by a run-length encoding scheme that would create and store a histogram of run length encodings. Many run-length encoding schemes are known in the art, such as described, for example, in "Optimization of Facsimile Data Compression" by R. Ohnishi, Y. Ueno and F. Ono, published in the National Telecommunications Conference Record, 1977, pp. 49.1.1–49.1.6. As statistics are accumulated, it is expected that the appropriate encoding tables will be created so that the compressed storage technique can be finely tuned.

Figure 2:
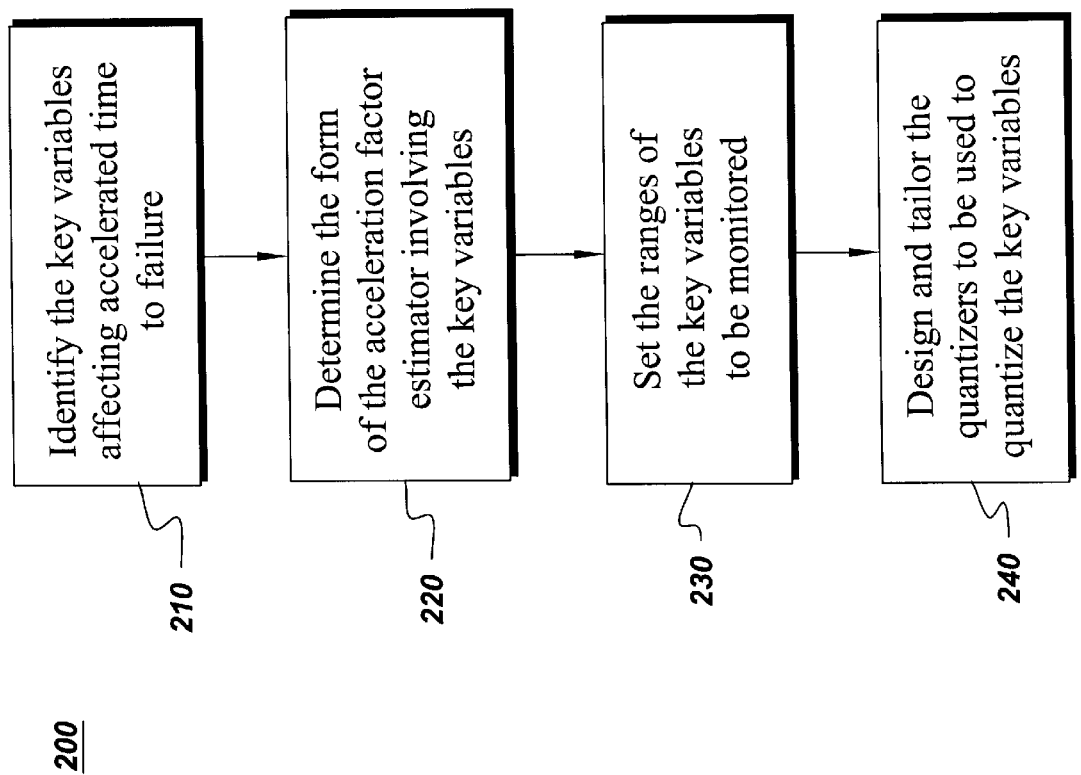
FIG. 2 is a flowchart describing a preferred method for constructing the acceleration factor estimator using tailored quantizers of FIG. 1.

FIG. 2 illustrates the functioning of the acceleration factor estimator using tailored quantizers via an operational flowchart 200. The key variables affecting accelerated time to failure are identified at the first step 210. This may be done by experimentation on a particular system or by physical modeling. At the next step 220, the form of the acceleration factor estimator involving the key variables identified in block 210 is determined. This step may also be accomplished by experimentation on a particular system or by physical modeling. At the next step 230, the ranges of the key variables to be monitored are set. This is done by considering the environmental and operating extremes of the equipment to be monitored. At the next step 240, the quantizers to be used to quantize the key variables are designed and tailored. This is accomplished by determining the resolutions and quantizer relationship required to represent the output signals of the individual sensors measuring the key variables over the ranges determined at step 230. In a preferred mode for selecting the quantizer relationship, the quantization error introduced into the acceleration factor estimator by any quantizer is approximately constant over the range of the measured variable. The resolution of the individual quantizers may be chosen so that the number of possible individual addresses calculated by address calculator 140 of FIG. 1 is as close as possible to the size of memory 150, without exceeding it.

Figure 3:
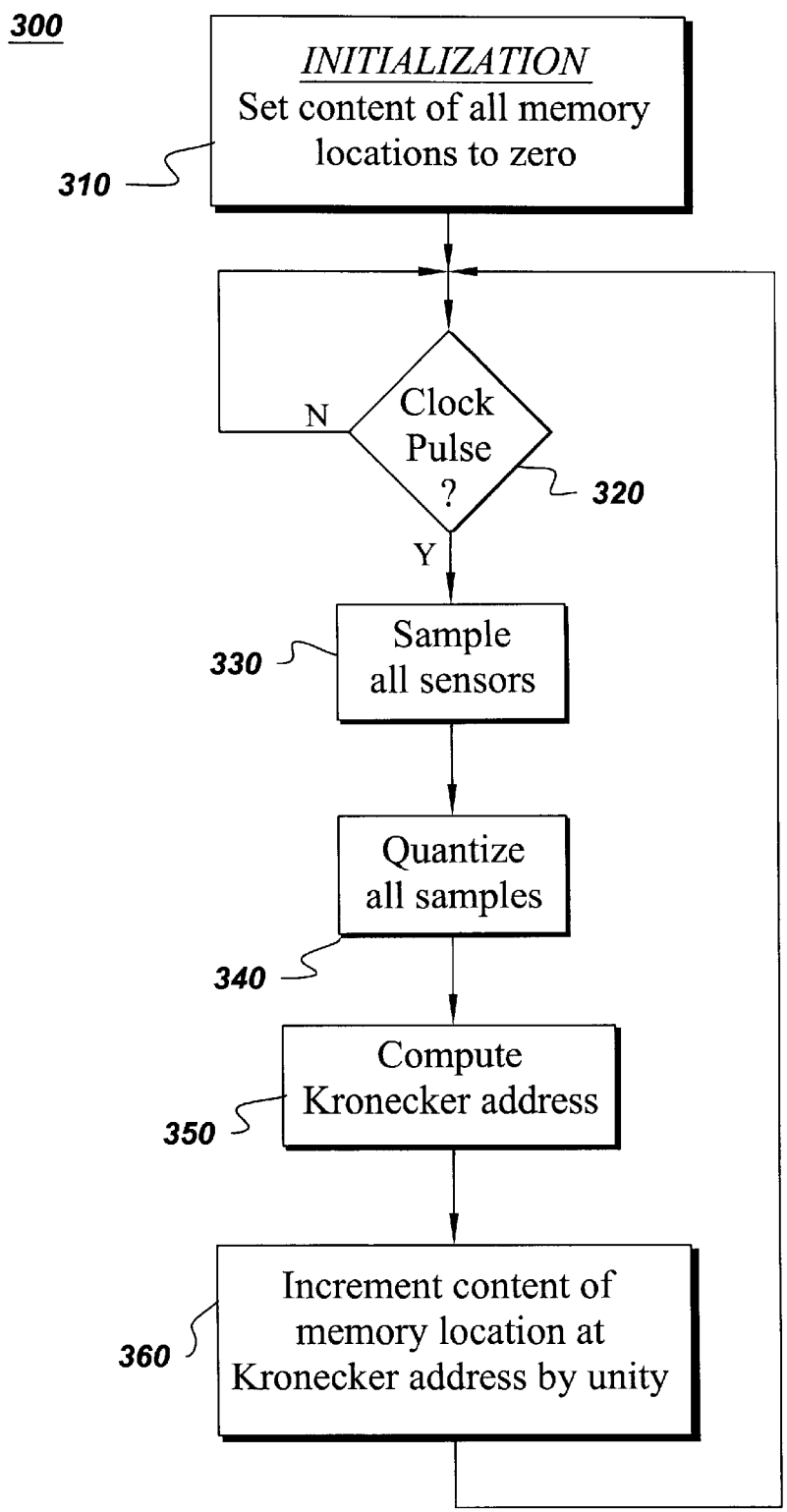
FIG. 3 is a flowchart illustrating the function of the acceleration factor estimator using tailored quantizers of FIG. 1.

FIG. 3 is a flowchart 300 recounting the ordered functions of the acceleration factor estimator using tailored quantizers. Step 310 is the initialization step where all memory locations are set to zero. At step 320, a decision is made in accordance with whether or not a sampling command is present from clock 160. At step 330, all of the sensors are sampled and, at step 340, all of the samples from the sensors are quantized, each quantization being made according to the quantizer designed and tailored for its associated sensor over the monitoring range of that sensor.

At step 350, the Kronecker address is computed. This address is a one-to-one mapping of the quantizer output signals to a memory address which is provided to the memory 150 (FIG. 1). The next step 360 involves unit incrementation of the content of the memory location specified by the Kronecker address. A preferred mode of generating the Kronecker address is to concatenate the output signals of the individual sensors to form a binary address.

As an example, consider the instant method and apparatus used in monitoring for reliability prediction of plastic-encapsulated-microcircuit (PEM) devices. The governing model of choice is the Department of Defense Reliability Analysis Center PEM model as described by Y-L. Mok and L-M. Ten in "A Review of Plastic-Encapsulated-Microcircuit Reliability-Prediction Models," published in the proceedings of the Annual Reliability and Maintainability Symposium, 2000, on pages 200–209. This model uses Peck's empirical model that includes a temperature and relative humidity acceleration factor. This factor is a product of terms involving the cube of the effective relative humidity (RH), (cons tan t·RH)$^3$, and an Arrhenius-like term containing $e^{-costant\ t\text{-}activation\ energy}$ where the constant includes a function of the non-operating ambient temperature.

With two sensors, one monitoring the activation energy, which is assumed to be directly proportional to temperature, and the other sensor monitoring relative humidity, two bits are assumed allocated to the temperature quantizer and one bit to the relative humidity quantizer. Thus, for the example, $B_1=2$ and $B_2=1$. For clarity of this example, the acceleration factor estimator, $\hat{F}_A$, is assumed to be described by the formula $\hat{F}_A=(RH)^3 \cdot e^{-T/100}$, where $RH$ is the relative humidity and the operational ranges are determined to be $0\% \leq RH \leq 90\%$ and $0° F. \leq T \leq 200° F$. Allowing two bits for the temperature quantization, they can be allocated as follows:

| Temperature Range (degrees F.) | Temperature Quantizer Output Signal |
|---|---|
| 0–29 | 00 |
| 29–69 | 01 |
| 69–139 | 10 |
| 139–200 | 11 |

One bit allowed for the relative humidity range can be allocated as follows:

| Relative Humidity (%) | Rel. Humidity Quantizer Output Signal |
|---|---|
| 0–71 | 0 |
| 71–90 | 1 |

The three-bit Kronecker address is formed by concatenating the relative humidity quantizer output signal to the temperature quantizer output signal. The memory required must thus have $2^3=8$ locations. From initialization to initialization (step 310 of FIG. 3) it is assumed that there is a maximum of a year's worth of sampling at a sampling rate of one sample per second. This is approximately 30 million samples and thus the memory words must be at least 25 bits long.

FIG. 4 depicts the functioning of the acceleration factor estimator using tailored quantizers for 4 samples according to the example. If the 8-locations of the example memory are assigned by the following correspondence to the Kronecker address bits:

memory location=4*first bit+2*second bit+third bit, then the contents of the memory locations change as follows:

| Sampling Time | Content of Memory Location | | | | | | | |
|---|---|---|---|---|---|---|---|---|
| | 0 | 1 | 2 | 3 | 4 | 5 | 6 | 7 |
| 0 | 0 | 0 | 0 | 0 | 0 | 0 | 0 | 0 |
| 1 | 1 | 0 | 0 | 0 | 0 | 0 | 0 | 0 |
| 2 | 1 | 0 | 0 | 0 | 1 | 0 | 0 | 0 |
| 3 | 1 | 0 | 0 | 0 | 2 | 0 | 0 | 0 |
| 4 | 1 | 0 | 0 | 0 | 2 | 0 | 0 | 1 |

While only certain preferred features of the invention have been illustrated and described, many modifications and changes will occur to those skilled in the art. It is, therefore, to be understood that the appended claims are intended to cover all such modifications and changes as fall within the true spirit of the invention.

What is claimed is:

1. An apparatus for estimating the time to failure acceleration factor of a large industrial motor, comprising:
   at least one sensor responsive to an environmental variable;
   a clock for controlling sampling times of said at least one sensor,
   a memory address calculator for mapping output signals of said at least one sensor to a memory address; and
   a memory unit for incrementing the content of said memory address by unity.

2. An apparatus for estimating the time to failure acceleration factor of a large industrial motor, comprising:
   a plurality of sensors, each of said sensors being responsive to a respective environmental variable;
   a clock for controlling sampling times of said sensors;
   a memory address calculator for mapping output signals of said sensors to a memory address; and
   a memory unit for incrementing the content of said memory address by unity.

3. The apparatus of claim 2 wherein at least one of said sensors is selected from a group consisting of a humidity sensor, a temperature sensor, a current sensor, and an inclinometer.

4. The apparatus of claim 2 wherein said sensors are adapted to provide analog output signals.

5. The apparatus of claim 4 including a plurality of samplers, each of said sensors being coupled to a respective one of said samplers for providing an output signal thereto; and a plurality of quantizers, each of said samplers being coupled to a respective one of said quantizers for providing an output signal thereto.

6. The apparatus of claim 5 wherein each of said quantizers is coupled to said memory address calculator for providing an output signal thereto.

7. The apparatus of claim 6 wherein said memory address calculator comprises a Kronecker address calculator.

8. The apparatus according to claim 6 wherein the memory address calculator is coupled to said memory unit for providing output signals thereto.

9. The apparatus according to claim 7 wherein the memory address calculator is coupled to said memory unit for providing output signals thereto.

10. The apparatus according to claim 6 wherein a plurality of output signals of said memory address calculator are compressed to a single memory address.

11. The apparatus according to claim 7 wherein a plurality of output signals of said memory address calculator are compressed to a single memory address.

12. A method for estimating the time to failure acceleration factor of a large industrial motor, comprising the steps of:
   periodically sampling an output signal from at least one sensor responsive to an environmental variable;
   mapping said output signal of said at least one sensor to a memory address; and
   incrementing the content of a memory at said memory address by unity.

13. A method for estimating the time to failure acceleration factor of a large industrial motor, comprising the steps of:
   periodically sampling output signals from a plurality of sensors, each of said sensors being responsive to a respective environmental variable;
   mapping said output signals of said sensors to a memory address; and
   incrementing the content of a memory at said memory address by unity.

14. The method of claim 13 wherein at least one of said sensors is selected from a group consisting of a humidity sensor, a temperature sensor, a current sensor, and an inclinometer.

15. The method of claim 14 wherein the output signals of said sensors are in analog format.

16. The method of claim 14 wherein the output signals mapped to said memory address comprise a Kronecker address.

17. The method according to claim 14 wherein the output signals mapped to said memory address are compressed to a single memory address.

* * * * *